Feb. 23, 1943.   B. E. CHROMY   2,312,075
POTATO PICKING IMPLEMENT
Filed March 9, 1942   2 Sheets-Sheet 2
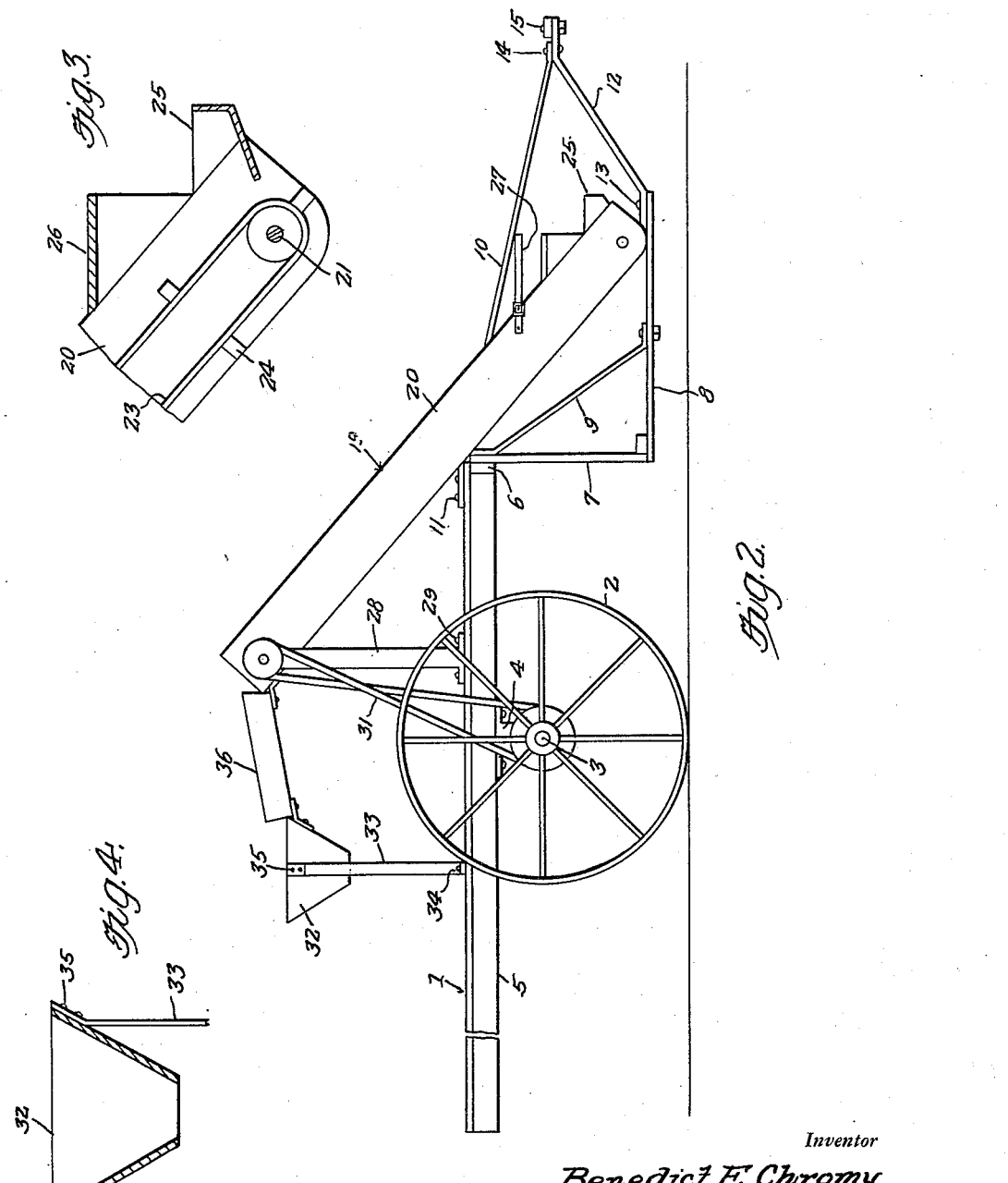
Inventor
Benedict E. Chromy
By Clarence A. O'Brien
and Harvey B. Jackson
Attorneys Patented Feb. 23, 1943

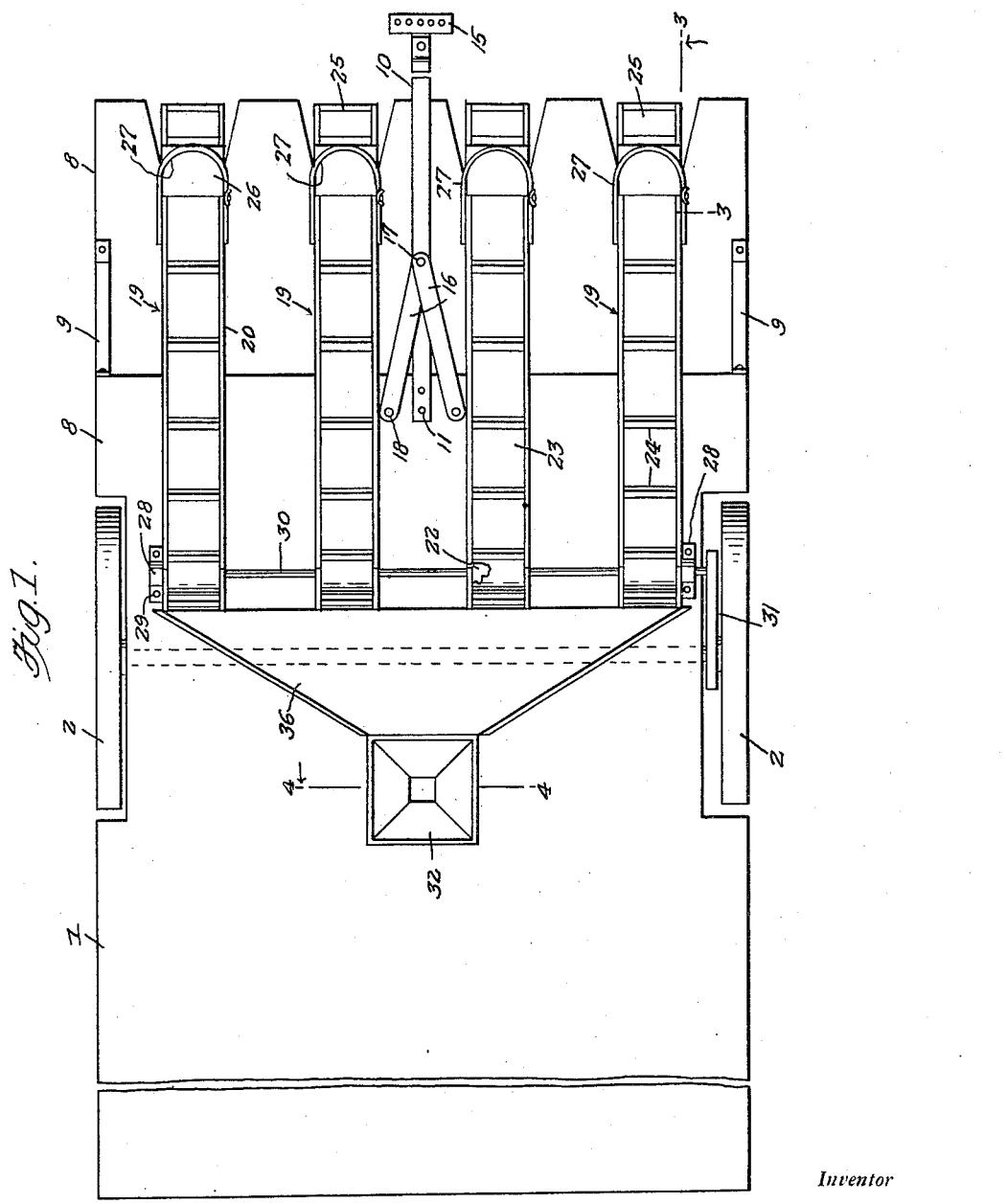

2,312,075

UNITED STATES PATENT OFFICE 2,312,075

POTATO PICKING IMPLEMENT

Benedict E. Chromy, Grafton, N. Dak.

Application March 9, 1942, Serial No. 433,982

1 Claim. (Cl. 214—83)

My invention relates to improvements in potato picking implements, the principal object in view being to provide a practical, inexpensive, draft implement for attachment to a tractor, or the like, and use in transporting a gang of manual pickers along rows of dug-up potatoes so that they may rapidly pick up the potatoes from a plurality of rows, the implement embodying means for conveying the potatoes thus picked up to a place of disposal.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in top plan of a preferred embodiment of my invention,

Figure 2 is a view in side elevation,

Figure 3 is a fragmentary view in longitudinal vertical section taken on the line 3—3 of Figure 1, and Figure 4 is a view in transverse section taken on the line 4—4 of Figure 1.

Referring to the drawings by numerals, my improved implement, in its preferred embodiment, comprises a substantially rectangular platform 1 supported at substantially its transverse center by a pair of ground wheels 2 loose on an axle 3 mounted in bearings 4.

The platform 1 comprises suitable side beams, as at 5, and cross-beams, as at 6. Suitably supported at the front of the platform 1, as by the upright member 7, is a lower, front platform section 8, substantially rectangular, and designed when the implement is hitched to a tractor to be disposed close to the ground. Diagonal braces 9 extend between the member 7 and section 8.

A draft rigging extends forwardly from the section 8 in the center line of draft and which comprises a draft bar 10 bolted at its rear end, as at 11, to the platform 1, an upwardly and forwardly extending draft bar 12 bolted, as at 13, to the front of the section 8 and to the bar 10, as at 14, and which is provided with a clevis 15 for coupling to a tractor, not shown. Brace bars 16 bolted to the bar 10, as at 17, and to the platform 1, as at 18, reinforce the bar 10.

Extending upwardly from the front edge of the platform section 8 over the front edge of the platorm 1 in upwardly and rearwardly inclined position is a plurality of elongated, conveyer units 19 spaced apart laterally and parallel in correspondence with the usual spacing of rows of potatoes in a field.

Each conveyer unit 19 comprises a pair of side panels 20 suitably anchored in spaced-apart relation, a pair of transverse, horizontal front and rear rollers 21, 22, and an endless conveyer belt 23 trained around the pair of rollers and provided with cross-flights 24. As will be understood, the panels 20 and belt 23 of each conveyer unit 19 form a trough above the belt.

At the front end of each conveyer unit 19 is a small hopper 25 opening rearwardly onto the belt 23 and suitably secured on top of the panels 20. Immediately in the rear of the hopper 25 of each conveyer unit 19 is a seat 26 suitably secured on top of the panels 20. A belt strap 27 is provided above each seat 26, with its ends suitably attached to the side panels 20 at each side of the seat.

A pair of uprights 28 are provided on the platform 1, at the opposite sides of the outside conveyer units 19 and are bolted to said platform, as at 29. A transverse conveyer drive shaft 30 is journaled at its ends in said uprights 28, the shaft extending through the panels 20 of the conveyer units 19 and having the rear rollers 20 fast thereon. A crossed belt and pulley drive 31 is provided between one of the wheels 2 and one end of the shaft 30 for driving the upper stretches of the belts 23 rearwardly under forward travel of said wheel.

Suitably secured on the platform 1, in the longitudinal center thereof, and in the rear of the conveyer units 19 is an elevated disposal hopper 32. Preferably a pair of uprights 33 bolted to the platform, as at 34, and to the hopper 32, as at 35, are provided for supporting the latter.

A flat bottomed chute 36 with rearwardly converging sides extends between the rear ends of the conveyer units 19 and said hopper 32 and is suitably secured to the same, as by brackets 37, in rearwardly and downwardly inclined position.

The described implement is designed to be towed slowly in the field by a tractor with the conveyer units 19 over rows of dug-up potatoes and pickers seated on the seats 26 astride the front ends of the conveyer units 19 and the belts arranged in front thereof so that they may lean forwardly easily and safely and pick up potatoes in front of the sections 8. The potatoes thus picked up are deposited in the hoppers 25 from which they roll rearwardly onto the belts 23 to be carried thereby to the chute 36 from which they roll into the disposal hopper 32.

As will be appreciated, the device provides a simply constructed practical implement enabling a gang of pickers to harvest a large number of potatoes in a short time with a minimum amount of labor.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claim.

What I claim is:

An implement for hitching to a tractor and transporting a gang of workers over a field to pick up potatoes dug up from rows comprising a wheel supported platform, a front platform section suspended from the front of said platform below the same to dispose the same close to the ground, a plurality of conveyer units extending from the front edge of said section upwardly and rearwardly over the platform and laterally spaced relatively in correspondence with the spacing of said rows, seats for the workers at the front ends of said conveyers, respectively, overlying said ends whereby the workers may sit astride the conveyers and bend forwardly to pick up potatoes in front of said section and deposit the same on said conveyers, a drive for operating the conveyers to transport the potatoes rearwardly and operative by one of said wheels, a disposal hopper on said platform, and a chute between said conveyers and disposal hopper.

BENEDICT E. CHROMY.